Dec. 9, 1952

D. E. PRIEST 2,621,224

MECHANICAL-ELECTRICAL DISPLACEMENT CONVERTER

Filed Oct. 8, 1949

INVENTOR
DORMAN E. PRIEST
BY Roy A. Plant
ATTORNEY

Dec. 9, 1952　　　　　D. E. PRIEST　　　　　2,621,224
MECHANICAL-ELECTRICAL DISPLACEMENT CONVERTER
Filed Oct. 8, 1949　　　　　　　　　　　　　2 SHEETS—SHEET 2

INVENTOR
DORMAN E. PRIEST
BY Roy A. Plant
ATTORNEY

Patented Dec. 9, 1952

2,621,224

UNITED STATES PATENT OFFICE 2,621,224

MECHANICAL-ELECTRICAL DISPLACEMENT CONVERTER

Dorman E. Priest, North Lexington, Mass., assignor to Physicists Research Company, Ann Arbor, Mich.

Application October 8, 1949, Serial No. 120,329

13 Claims. (Cl. 171—209)

The present invention relates broadly to mechanical-electrical conversion units, and in its specific phases to an apparatus of this type utilizing a fixed alternating magnetic flux circuit and a positioning coil.

Considerable development work has been carried on in connection with electrical methods of measuring small dimensional changes or displacements, and the greatest progress along this line has been made in measuring such quantities quite rapidly so that the electrical frequencies involved normally range from ten cycles per second to several thousand cycles per second and upward. An important class of such converters generate electrical voltages by the motion of a coil in the flux field of a permanent magnet. A fundamental limitation of such an apparatus is that it will not measure static displacements since the generated voltage is zero when the coil is at rest. Further, the amplifiers ordinarily used with such converters have a "low frequency cut-off" point below which phase and amplitude distortions are excessive. Generally speaking, the present invention, which is a continuation-in-part of my copending patent application, Serial No. 555,942, filed September 27, 1944, and abandoned October 14, 1949, in favor of this application and application Ser. No. 120,328, filed October 8, 1949, belongs to a class of converters which are not subject to the above limitations, and accordingly static, as well as dynamic, measurements of small dimensional changes or displacements can be made. This is achieved by providing an apparatus adapted to use an alternating current "carrier" signal whose amplitude is varied or "modulated" by varying the position of a converter coil in accordance with variations in the displacement being measured.

Others have devised various forms of conversion units utilizing the "carrier" principle for effecting electrical measurements of static and dynamic displacements of one type or another, but each of those forms of apparatus has had specific limitations which have interfered with and reduced the field of usefulness of each of them. In other words, those types of apparatus, in many cases, have been of high-impedance type subject to stray capacitance effects and pick-up, others have used bridge circuits having supposedly identical characteristic coils, et cetera, which raises the difficulties of matching coils, as well as overcoming temperature effects and bridge balancing problems. Others have been subject to electrical current leakage difficulties as typified by piezoelectric converters, and also high mechanical impedance such as is encountered with moving iron types of converters. It was a recognition of the shortcomings of these various forms of the prior-art mechanical-electrical converters, and the knowledge of a need for an improved apparatus for measuring or indicating dimensional changes, or the extent of displacements which occur either under static conditions or under varying frequency conditions, which led to the conception and development of the present invention.

Accordingly, among the objects of the present invention, is the production of a highly accurate and stable mechanical-electrical conversion unit for use in investigating displacements and dimensional changes, such for instance as are found in the profiles of surfaces, and which may involve either static or varying frequency conditions.

Another object is to provide a mechanical-electrical conversion unit for measuring or indicating dimensional characteristics or the extent of displacements wherein both bridge circuits and moving armatures, with their shortcomings, may be avoided.

Another object is to provide a mechanical-electrical conversion apparatus where the moving parts are of very light weight so as to have a low mechanical impedance.

Another object is to provide a mechanical-electrical conversion apparatus wherein its output is intrinsically linear throughout the operating range, such range being pre-chosen and the elements of the assembly designed to handle that range.

Another object is to provide a mechanical-electrical conversion unit having an inner and an outer pole with a positioning coil movable lengthwise in the gap between said poles, said positioning coil being either considerably longer or considerably shorter than the length of the gap.

Another object is to provide an apparatus utilizing a mechanical-electrical displacement converter, of the modulation type, which is adapted for use in the measurement of not only dimensional displacements but also quantities which can be converted into dimensional changes.

A further object is to provide a mechanical-electrical conversion apparatus for use in measuring or indicating dimensional changes or the extent of displacements, wherein the use of a positioning coil to obtain amplitude-modulation of a "carrier" voltage induced in said coil by variable linkage with a fixed magnetic circuit carrying a substantially constant alternating flux, is a feature of the invention rather than a coil which must be used to generate voltage due to the movement of the coil in a uni-directional flux circuit such as produced by a permanent magnet.

A still further object is to provide a mechanical-electrical conversion apparatus wherein such apparatus is in the form of a single unit which is highly linear, has low electrical and mechanical impedance, and wherein temperature affects are either eliminated or easily overcome.

Still further objects and advantages of the invention will appear as the description proceeds.

To the accomplishment of the foregoing and related ends, the invention, then, consists of the mechanical-electrical conversion means hereinafter fully described and particularly pointed out in the claims, the annexed drawings and the following description setting forth in detail certain means for carrying out the invention, such disclosed means illustrating, however, but several of various ways in which the principle of the invention may be used.

Figure 1:
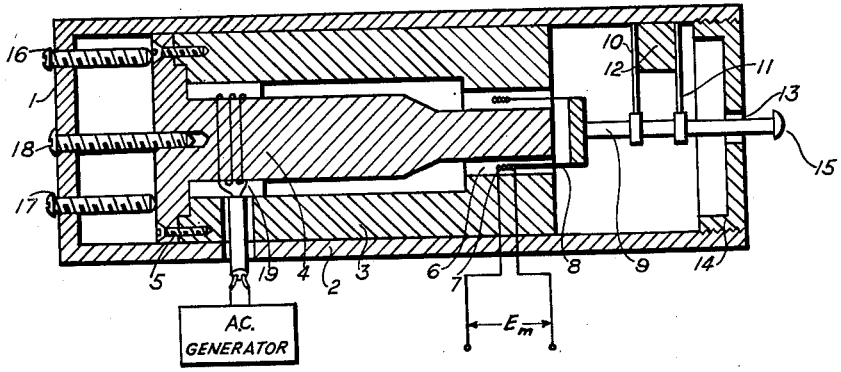
Figure 1 shows an enlarged diagrammatic form of a typical mechanical-electrical conversion unit which forms part of the present invention.

Referring to Figure 1, the converter assembly 1 has a housing 2 which contains an outer pole member 3 and an inner pole member 4 concentric therewith. These two pole members are fastened together in conventional manner, for instance by screws 5. The gap 6 between the free ends of the outer and inner poles, while subject to non-uniform flux density at the ends of the gap, is shaped for substantially uniform flux density and is moderately long. Mounted for movement axially in gap 6 is a relatively short positioning coil 7 mounted on a light-weight coil form 8. This coil form is mounted on the end of stem 9 which is supported by a pair of cantilever leaf springs 10 and 11 which are joined to housing 2 by means of a conventional spacing block 12. Stem 9 projects through a suitable opening 13 in end plate 14 and carries contacting point 15, which is diagrammatically illustrated in enlarged size on the end thereof. The particular form of the contact point will depend upon the type of investigations to be made. For surface roughness measurements a hemispherical contact tip of from .00005″ to .0005″ tip radius is very satisfactory, and a conventional material from which to make same is a diamond. To determine waviness of a surface the contact point may have a larger radius.

The preferable range of operation of the apparatus is such that the movement of the positioning coil 7 is within a region approximately equally spaced from the center of the length of the gap 6 and wholly within same. The adjustment of the location of the positioning coil 7 in gap 6 is accomplished by means of adjusting screws 16, 17, and 18. In actual practice these screws are preferably actuated to move the assembly to a point where, within the limits of the operation of the apparatus, the output voltage of positioning coil 7 is, for all practical purposes, a linear function of the displacement of positioning coil 7 in a direction substantially axial with the center line of annular gap 6.

This adjustment is made only during manufacture or calibration, and thereafter the magnetic circuit remains completely fixed. An exciting coil 19 is used to produce the alternating magnetic flux in pole pieces 3 and 4. This flux crosses gap 6, and by linking positioning coil 7 therein, produces an alternating "carrier" voltage in that coil. The amplitude of said "carrier" voltage depends upon the relative position of the positioning coil 7 in gap 6. Thus the voltage $E_m$ produced in the positioning coil 7 is amplitude-modulated in step with the mechanical displacements of said coil. A conventional circuit showing the connection and electrical operation of positioning coil 7 and exciting coil 19 will be hereinafter described.

Figure 2:
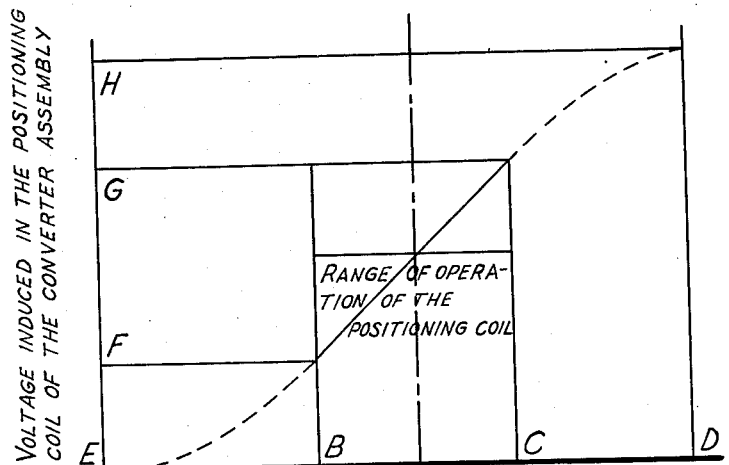
Figure 2 shows a characteristic curve of the out put of the displacement converter diagrammatically illustrated in Figure 1.

Figure 2 shows a typical characteristic curve of voltage induced in the positioning coil 7 plotted against displacement of the positioning coil in a converter wherein the gap 6 is long compared with the length of the positioning coil as shown in Figure 1. Referring more particularly to the Figure 2 curve, when the positioning coil 7 is at the right hand end of gap 6, as viewed in Figure 1, it is in a non-uniform alternating magnetic flux field and as the coil location is changed to a position further into gap 6 the flux field becomes more uniform. The non-uniform flux region here involved is the one where the voltage induced in the positioning coil increases from E to F as the coil position is changed from A to B. With the positioning coil in the uniform flux region between positions B and C, the voltage which is induced has a value which correspondingly lies between F and G. Further change of location of the positioning coil to the left places it in the second region of non-uniform magnetic flux existing at the inner or left hand boundary of gap 6, which corresponds to region C—D on the Figure 2 curve, and voltages are produced having corresponding values lying in the G to H range. In order to obtain essentially linear readings of voltages for corresponding positions of positioning coil 7, the apparatus is adjusted and used with the positioning coil operating between the positions B and C. It is to be noted that as long as the positioning coil remains in any given position, the voltage induced in it remains at the value indicated on the graph.

Figure 3:
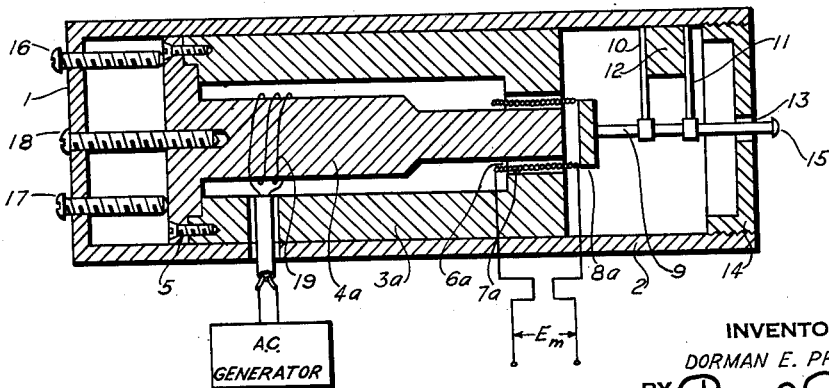
Figure 3 shows a modified form of the mechanical-electrical conversion unit illustrated in Figure 1.

Diagrammatically indicated in Figure 3 is a modification of the combination illustrated in Figure 1. It should be noted that basically the positioning coil should be of a length different from that of the gap in which it moves. A positioning coil which is short relative to the length of the gap has been shown in Figure 1 while the converse is shown in Figure 3 where positioning coil 7a is longer than gap 6a. To facilitate the latter construction the outer pole member 3a is made with a little shorter gap 6a than is shown in Figure 1. The inner pole member 4a likewise is modified to produce a longer straight portion extending into gap 6a so that the inner end of positioning coil 7a will not be obstructed in its movement. The positioning coil in this case is also preferably mounted on a suitable coil form 8a. Where a short positioning coil is used as shown in Figure 1, the length of the gap is preferably greater than the combined length of the positioning coil and the length of the travel range desired in the gap, while with the long positioning coil as shown in Figure 3, the length of the positioning coil is preferably greater than the combined length of the gap and the length of the travel range desired for the positioning coil. The use of a long positioning coil, as described, produces a voltage curve plotted against coil position which is substantially the same as shown in Figure 2 with a substantially linear portion in the main operating range. With the Figure 3 arrangement the curve may have a substantially parabolic portion for a part of the curve in the areas AB and CD. These substantially parabolic curves and the linear portion of the curve are joined by complex curves which do not interfere with operation of the assembly either in the linear range or the substantially parabolic range.

Figure 4:
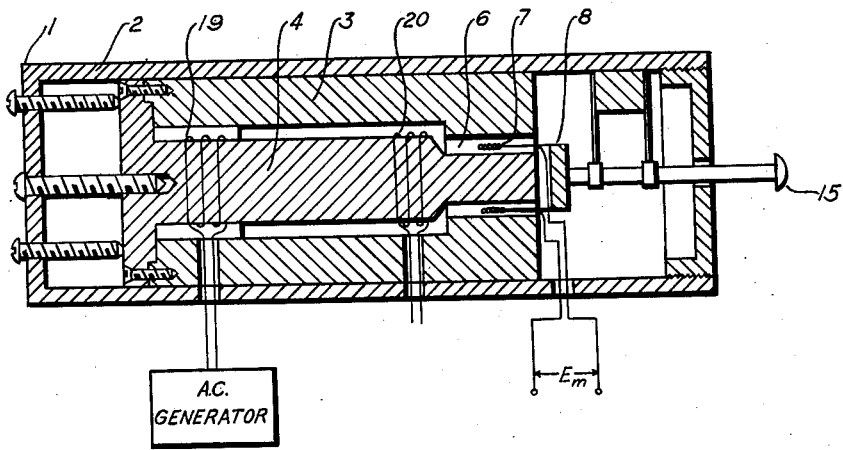
Figure 4 shows another modified form of the mechanical-electrical conversion unit illustrated in Figure 1.

Another modified form of the converter assembly 1 shown in Figure 1 is diagrammatically illustrated in Figure 4. This converter assembly involves the use of a third coil 20 on the alternating magnetic flux circuit of the assembly with such coil preferably being located in a portion of or adjacent to gap 6. Such third coil may be connected for utilization of its output in various ways. For instance it may be used to supply a pre-chosen constant voltage to the input and phasing network 21, Figure 5, in the place of that normally supplied direct thereto from generator 22. The voltage produced in such coil is of substantially the same wave shape as that induced in the positioning coil, and hence it is very adaptable for use in the input and phasing network 21 for substantial neutralization of the minimum voltage delivered by the positioning coil. In some cases it may be desired to raise or lower the voltage which would normally be delivered from positioning coil 7 to the input and phasing network of Figure 5. In this case the third coil 20 can be connected in series with said positioning coil 7. This series connection can be made in two ways, in one of which the two will add to produce a greater "carrier" voltage than either of them alone, while the reverse connection will cause the voltage output of the third coil to buck the output of the positioning coil and thus produce a lower "carrier" voltage than the largest of them alone. However, the rate of change of the amplitude of the "carrier" voltage with the displacement of the positioning coil will be unaffected by the amount of voltage supplied by the third coil. This is due to the fact that the modulation of the "carrier" voltage is determined only by the change in flux linkages of the positioning coil with the alternating magnetic flux.

Figure 5:
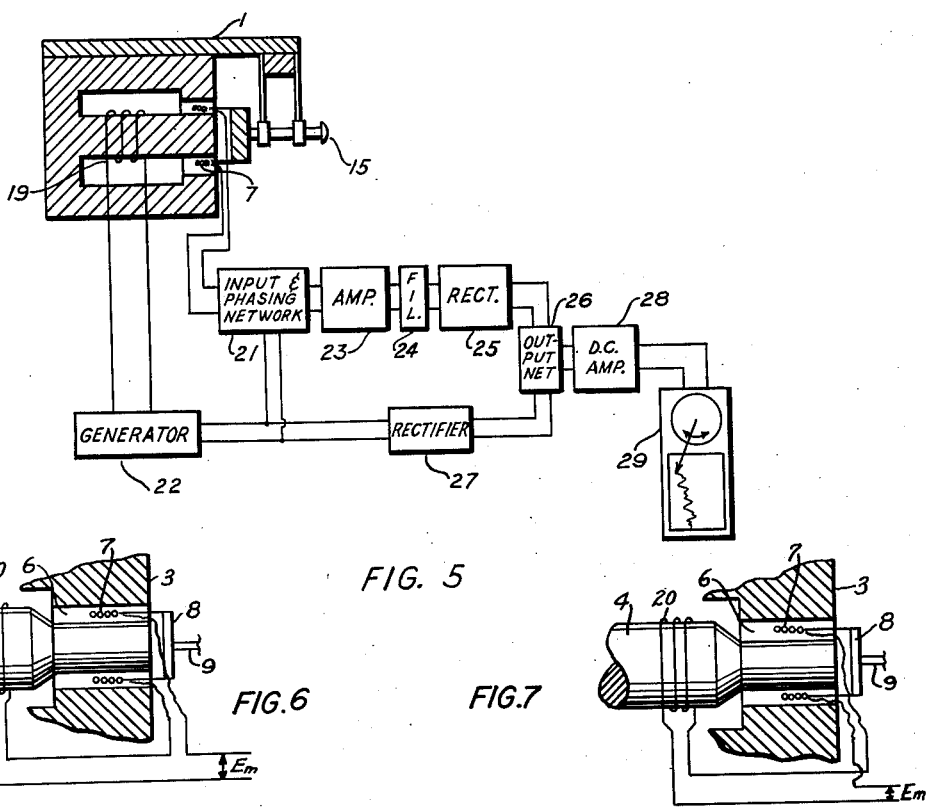
Figure 5 shows in diagrammatic manner a schematic wiring diagram illustrating one typical way in which the mechanical-electrical conversion unit of the present invention can be used.
Figure 6:
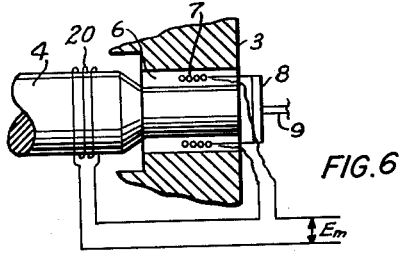
Figures 6 and 7 show fragmentary sectional views diagrammatically illustrating two ways of electrically connecting the fixed coil and the positioning coil illustrated in the assembly of Figure 4.
Figure 7:
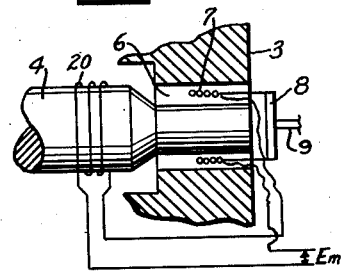

The mechanical-electrical conversion unit of the present invention may be used in many ways, and one wherein it has been found to be highly satisfactory has been in connection with the indicating or recording of irregularities of the profile of a specimen, which is covered by another patent application which I am filing concurrently herewith. Figure 5 shows diagrammatically one conventional use of the converter assembly of the present invention. Referring more particularly to that figure, generator 22 supplies energizing current to exciting coil 19 of converter assembly 1 while positioning coil 7 delivers its output to the input and phasing network 21. Generator 22 also delivers a pre-chosen, constant alternating voltage to the input and phasing network 21 for use in alternating current bucking to at least partially neutralize the minimum voltage delivered from positioning coil 7. Such voltage, when subtracted from the output voltage of positioning coil 7, causes the output voltage from the input and phasing network 21 to vary by a greater percentage for a given displacement of positioning coil 7. The output from the input and phasing network 21, in turn, is amplified in amplifier 23, and delivered to band-pass filter unit 24. Band-pass filter unit 24 reduces the amount of extraneous voltages which appear in amplifier 23, an allows the narrow band of frequencies used to be transmitted substantially without interference. The filter output is delivered to a rectifier circuit 25. This rectification provides demodulation of the amplitude-modulated carrier so that voltages of frequencies corresponding to the displacements of contacting point 15 are obtained. The output of rectifier 25 is delivered to output network 26.

Generator 22 also delivers a pre-chosen and constant voltage to rectifier circuit 27, and the pre-chosen constant output of the latter is delivered to output network 26, but is of opposite polarity to the input thereto from rectifier circuit 25, so as to substantially cancel out the remaining minimum voltage not neutralized in the input and phasing network 21. Under these conditions, the instantaneous value of any voltage appearing in the output of the network 26 is, for all practical purposes, due entirely to a displacement of the positioning coil 7 from the pre-chosen zero or reference position of same. These instantaneous voltages are thus obtained by the demodulating action of rectifier 25 on the amplitude-modulated carrier voltage appearing in amplifier 23. These instantaneous voltages are then further amplified by a D. C. amplifier 28 whose output is applied to the indicating or recording meter 29. A suitable type of recorder 29 consists of a D'Arsonval type of movement carrying a pointer which may be arranged to indicate, or to mark directly on a moving chart.

Other modes of applying the principle of my invention may be employed instead of those explained, change being made as regards the combinations herein disclosed, provided the means stated by any of the following claims or the equivalent of such stated means be employed.

I therefore particularly point out and distinctly claim as my invention:

1. A mechanical-electrical displacement converter adapted to be connected to a suitable source of alternating-current electric power, which comprises the combination of a fixed magnetic circuit means for carrying alternating magnetic flux, said magnetic circuit means having poles with a gap therebetween, an exciting coil connectable to said source of alternating-current electric power for producing alternating magnetic flux in said magnetic circuit means, a positioning coil which is mechanically positionable and in which an alternating current voltage is induced through linkage with said alternating magnetic flux, said positioning coil differing in length from the length of said pole gap by an amount at least equal to the length of the maximum operating displacement range of said positioning coil, means for movably supporting said positioning coil in said gap thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, said movable supporting means providing for and restricting said positioning coil to motion substantially longitudinal of said gap, a contact point, means for connecting said positioning coil to said contact point for movement bodily in step therewith, and means for connecting said positioning coil supporting means to said magnetic circuit means.

2. In a mechanical-electrical displacement converter as set forth in claim 1, wherein means are provided for adjusting the position of said positioning coil and gap relative to each other for operation of said coil in a region of said gap having substantially constant magnetic flux density.

3. In a mechanical-electric displacement converter as set forth in claim 1, wherein said positioning coil is of light weight, and said means for movably supporting said positioning coil includes a light-weight coil form, said positioning coil and means for movably supporting same being of low mechanical impedance.

4. A mechanical-electrical displacement converter adapted to be connected to a suitable source of alternating-current power, which comprises the combination of a fixed magnetic circuit means for carrying alternating magnetic flux, said magnetic circuit means having poles with a substantially uniform gap therebetween, an exciting coil connectable to said source of electric power for producing alternating magnetic flux in said magnetic circuit means, a positioning coil which is mechanically positionable and in which an alternating current voltage is induced through linkage with said alternating magnetic flux, means for supporting said coil approximately centered longitudinally of said gap, said supporting means resiliently holding said positioning coil and restricting same to motion substantially longitudinal of said gap, thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, a contact point, means for connecting said positioning coil to said contact point for movement bodily in step therewith, and means for connecting said positioning coil supporting means to said magnetic circuit means.

5. In a mechanical-electrical displacement converter as set forth in claim 4, wherein said gap between said pole pieces is substantially annular, and said positioning coil freely fits in said gap and is substantially co-axial therewith.

6. In a mechanical-electrical displacement converter as set forth in claim 4, wherein said gap between said pole pieces is substantially annular with said positioning coil substantially co-axial therewith, and said positioning coil is carried on a light-weight coil form which is part of said means for movably supporting said positioning coil in said gap and which is of low mechanical impedance.

7. In a mechanical-electrical displacement converter as set forth in claim 4, wherein said substantially uniform gap between said pole pieces is substantially annular, said positioning coil is of light-weight construction freely fitting in said annular gap and is substantially co-axial therewith, and said means for movably supporting said positioning coil includes a light-weight coil form, said positioning coil and means for movably supporting same being of low mechanical impedance.

8. In a mechanical-electrical displacement converter as set forth in claim 4, wherein said substantially uniform gap between said pole pieces is substantially annular, said positioning coil is of light-weight construction freely fitting in said annular gap and is substantially co-axial therewith, said means for movably supporting said positioning coil includes a light-weight coil form, said positioning coil and means for movably supporting same being of low mechanical impedance, and said positioning coil is shorter than the length of said substantially annular pole gap by an amount at least equal to the length of the maximum operating displacement range of said positioning coil.

9. In a mechanical-electrical displacement converter as set forth in claim 4, wherein means are provided for adjusting the position of said positioning coil and gap relative to each other for operation of said coil in a region of said gap having substantially constant magnetic flux density.

10. A mechanical-electrical displacement converter adapted to be connected to a suitable source of alternating-current power, which comprises the combination of a fixed magnetic circuit means for carrying alternating magnetic flux, said magnetic circuit means having poles with a substantially annular gap therebetween, an exciting coil connectable to said source of electric power for producing alternating magnetic flux in said magnetic circuit means, a positioning coil which is mechanically positionable and in which an alternating current voltage is induced through linkage with said alternating magnetic flux, said positioning coil differing in length from the length of said pole gap by an amount at least equal to the length of the maximum operating displacement range of said positioning coil, means for supporting said positioning coil approximately centered longitudinally of said gap, thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, said supporting means including spring means for resiliently holding said positioning coil and restricting same to motion substantially longitudinal and approximately co-axial of said gap, a contact point, means for connecting said positioning coil to said contact point for movement bodily in step therewith, and means for holding said positioning coil supporting means in fixed position relative to said magnetic circuit means.

11. A mechanical-electrical displacement converter adapted to be connected to a suitable source of alternating-current electric power, which comprises the combination of a housing, a fixed magnetic circuit means mounted in said housing and adapted to carry alternating magnetic flux, said magnetic circuit means having poles with a substantially uniform gap therebetween, an exciting coil connectable to said source of electric power for producing alternating flux in said magnetic circuit means, a positioning coil which is mechanically positionable and in which an alternating current voltage is induced through linkage with said alternating magnetic flux, means for movably supporting said coil for movement in said gap, said supporting means being mounted on said housing and adapted to resiliently hold said positioning coil and restrict same to motion substantially longitudinal of said gap, thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, means for adjusting the location of said magnetic circuit means relative to said positioning coil supporting means so that the longitudinal movements of said positioning coil under operating conditions will take place substantially in the longitudinal center of said gap, a contact point, and means for connecting said positioning coil to said contact point for movement as a unit in step therewith.

12. A mechanical-electrical displacement converter adapted to be connected to a suitable source of alternating-current electric power, which comprises the combination of a fixed magnetic circuit means for carrying alternating magnetic flux, said magnetic circuit means having poles with a gap therebetween, an exciting coil connectable to said source of electric power for producing alternating magnetic flux in said magnetic circuit means, a fixed location coil mounted on said magnetic circuit means and located so as to be linked by magnetic flux therein, thereby inducing in said fixed coil a fixed alternating voltage, a positioning coil which is mechanically positionable and in which an alternating current voltage is induced through linkage with said alternating magnetic flux, means for connecting said fixed location coil in series with said positioning coil so that their output is the algebraic sum of the voltages induced in them, means for movably supporting said positioning coil in said gap, thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, said movable supporting means providing for and restricting said positioning coil to motion substantially longitudinal of said gap, a contact point, means for connecting said positioning coil to said contact point for movement as a unit in step therewith, and means for connecting said positioning coil supporting means to said magnetic circuit means.

13. A mechanical-electrical displacement converter adapted to be connected to a suitable source of alternating-current electric power, which comprises the combination of a fixed magnetic circuit means for carrying alternating magnetic flux, said magnetic circuit means having poles with a substantially uniform annular gap therebetween, an exciting coil connectable to said source of electric power for producing alternating magnetic flux in said magnetic circuit means, a fixed location coil mounted on said magnetic circuit means and located so as to be linked by magnetic flux therein, thereby inducing in said fixed coil a fixed alternating voltage, a positioning coil which is mechanically positionable and in which an alternating current voltage is induced through linkage with said alternating magnetic flux, said positioning coil differing in length from the length of said pole gap by an amount at least equal to the length of the maximum operating displacement range of said positioning coil, means for movably supporting said positioning coil in said gap, thereby providing linkage of said positioning coil with said alternating magnetic flux and inducing therein an alternating carrier voltage whose frequency is that of said source of electric power, and whose amplitude is modulated in step with and in response to the mechanical displacements of said positioning coil in said gap, means for connecting said fixed location coil and said positioning coil in series, thereby obtaining an amplitude-modulated output voltage for said displacement converter whose frequency is that of said source of electric power, and whose magnitude is the algebraic sum of said voltages induced in said positioning coil and said fixed location coil, said movable supporting means providing for and restricting said positioning coil to motion substantially longitudinal of said pole gap, a contact point, means for connecting said positioning coil to said contact point for movement as a unit in step therewith, and means for connecting said positioning coil supporting means to said magnetic circuit means.

DORMAN E. PRIEST.

REFERENCES CITED

The following references are of record in the file of this patent:

UNITED STATES PATENTS

| Number | Name | Date |
|---|---|---|
| 992,817 | Southgate | May 23, 1911 |
| 1,241,565 | Shoemaker | Oct. 2, 1917 |
| 1,830,402 | Miessner | Nov. 3, 1931 |
| 1,953,542 | Pridham | Apr. 3, 1934 |
| 2,002,372 | Greentree et al. | May 21, 1935 |
| 2,240,278 | Abbot | Apr. 29, 1941 |
| 2,344,217 | Reason et al. | Mar. 14, 1944 |
| 2,417,077 | Hoover | Mar. 11, 1947 |
| 2,469,137 | Strong | May 3, 1949 |